United States Patent [19]

Couprie

[11] Patent Number: 4,651,680
[45] Date of Patent: Mar. 24, 1987

[54] REDUCED WREATH CONDENSATION BOILER

[75] Inventor: Francois Couprie, Paris, France

[73] Assignee: Service National: Gaz de France, Paris, France

[21] Appl. No.: 888,407

[22] Filed: Jul. 23, 1986

[30] Foreign Application Priority Data

Jul. 25, 1985 [FR] France ............................ 85 11400

[51] Int. Cl.$^4$ ............................................. F22B 13/00
[52] U.S. Cl. .................................... 122/20 B; 122/14; 122/159; 122/167; 237/19
[58] Field of Search ............... 122/13 R, 14, 16–17, 122/20 B, 23, 32–33, 42–43, 44 R, 44 A, 45, 48, 122/114, 130, 135 R, 155 R, 155 F, 156, 159, 166 R, 122/167, 172, 332–333, 236; 237/19, 55; 126/101, 126/112, 350 R, 361, 365; 165/135, 921, 164

[56] References Cited

U.S. PATENT DOCUMENTS

| | | | |
|---|---|---|---|
| 4,011,904 | 3/1977 | Hope et al. ............... | 122/20 B X |
| 4,241,874 | 12/1980 | Schossow ................... | 237/55 |
| 4,366,778 | 1/1983 | Charrier et al. ........... | 122/17 |
| 4,444,156 | 4/1984 | Iwasaki et al. ............ | 122/20 B |

FOREIGN PATENT DOCUMENTS

| | | | |
|---|---|---|---|
| 108453 | 5/1984 | European Pat. Off. ........... | 126/101 |
| 2552858 | 4/1985 | France . | |
| 7644 | 1/1979 | Japan ................................ | 126/112 |

Primary Examiner—Albert J. Makay
Assistant Examiner—Steven E. Warner
Attorney, Agent, or Firm—Staas & Halsey

[57] ABSTRACT

A reduced wreath condensation boiler. A feed duct for fresh oxygen-carrying air taken from the atmosphere and an exhaust duct for exhausting diluted combustion products to the atmosphere downstream from the extractor fan are essentially parallel, but not coaxial, minimizing heat exchange. A first heat exchanger is disposed above the heating body for providing heat exchange between the fresh air from the feed duct and the combustion products from the heating body prior to dilution. Deflectors channel a portion of the air from said first heat exchanger to sweep the free space situated between the heating body and its airtight enclosure, while the remainder of the air from the first heat exchanger is directed towards the burner. At least one calibrated orifice injects the air which has swept over the heating body into the exhaust duct for the combustion products upstream from the extractor fan. This boiler reduces the wreath of water vapor where the flue gases are exhausted to the atmosphere.

9 Claims, 13 Drawing Figures

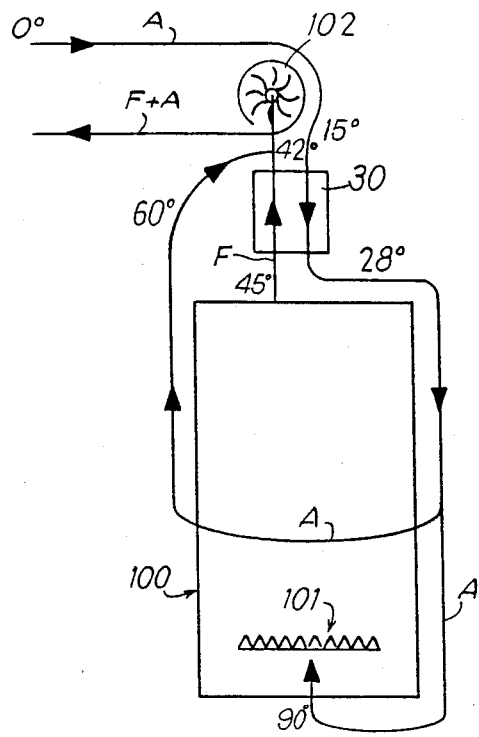
Fig. 1
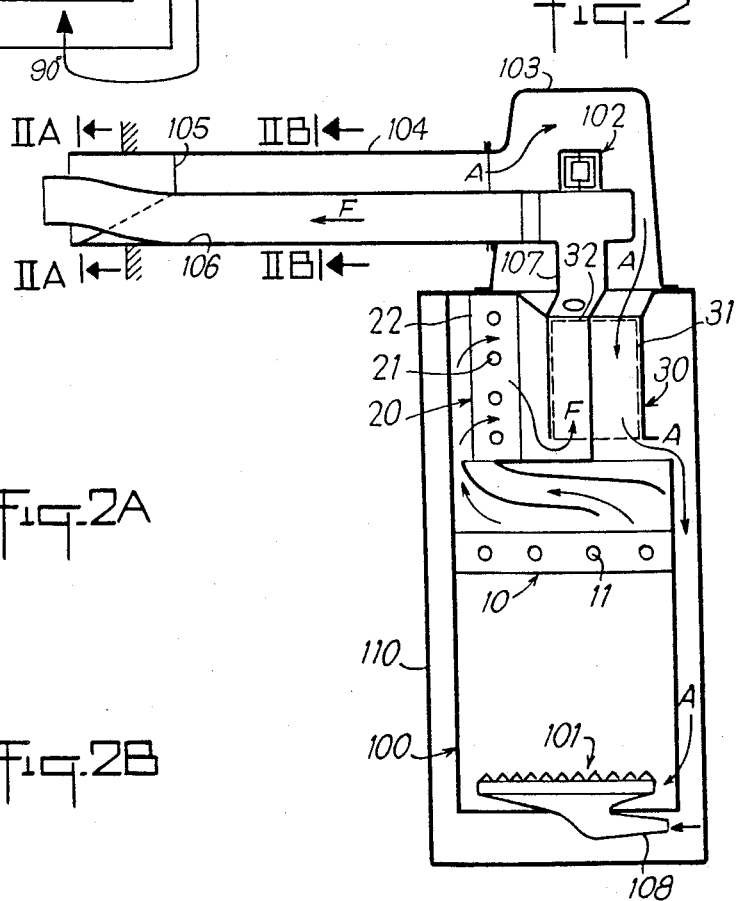
Fig. 2
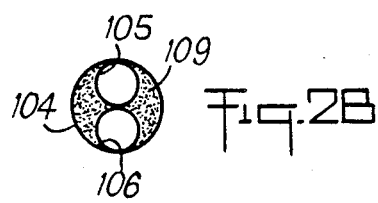
Fig. 2A
Fig. 2B

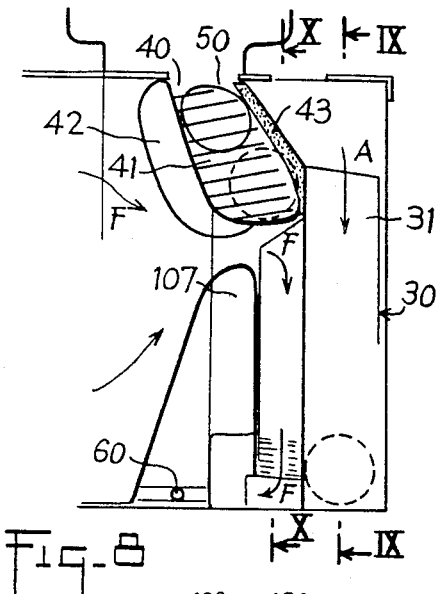
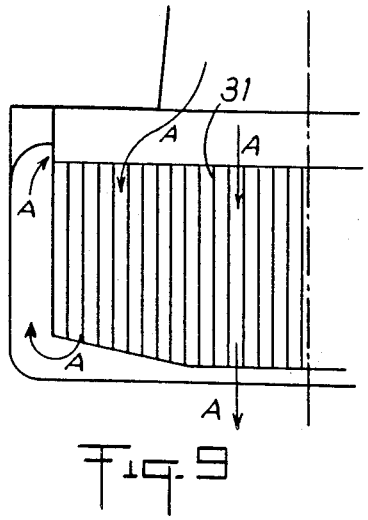
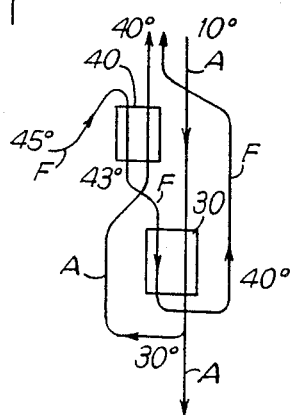
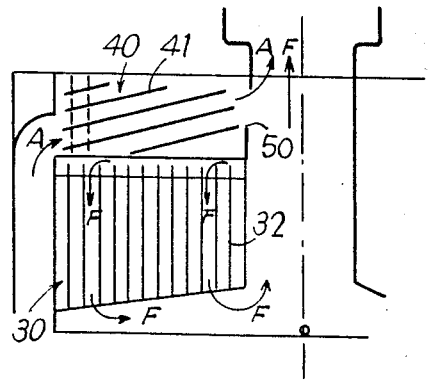
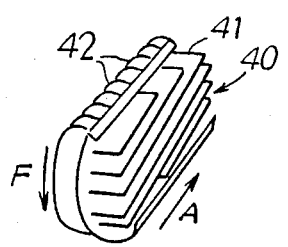

REDUCED WREATH CONDENSATION BOILER

The present invention relates to a reduced-wreath condensation boiler, comprising a feed duct for oxygen-carrying air, an exhaust duct for combustion products, a feed channel for fuel gas, a combustion product extractor fan, a heating body fitted with a burner, at least one heat exchanger-condenser for exchanging heat between a circuit of water to be heated and the combustion products formed in the heating body, and a circuit for removing the condensed water which forms on the heat exchanger-condenser, said heating body being enclosed in an airtight enclosure.

BACKGROUND OF THE INVENTION

The efficiency of a boiler increases with reducing outlet temperature of its combustion products, i.e. when less heat is carried away by its flue gases. The combustion products contain carbon dioxide and water. If the temperature of the combustion products is reduced far enough (below their dew point temperature, i.e. about 55° C., a portion of the water which they contain condenses, thereby releasing recoverable latent heat. Whence the term "condensation boiler" for designating such very high efficiency equipment which recovers as much of the sensible heat in the flue gases as possible together with a portion of the latent heat corresponding to condensation of the combustion-produced water vapor. This result is obtained by increasing the area of the heat exchanger between the flue gases and the water to be heated, or by providing a second or recovery heat exchanger in addition to the main heat exchanger.

In a condensation boiler the combustion products are nevertheless exhausted from the boiler at a temperature such that a portion of the total theoretically recoverable energy is lost. In addition, since the combustion products have been cooled down to saturation when they are rejected into the atmosphere, their rejection into a relatively cold atmosphere gives rise to a wreath of vapor which is several meters long and which is particularly unattractive when the flue outlet point is situated on the wall of a residential building, for example.

Proposals have already been made, for example in French patent application No. 8315657 to implement means which tend to limit the appearance of a wreath when the combustion products from a condensation boiler are rejected into the atmosphere. In this prior system, the combustion products are diluted with a fraction of the air taken from the immediate vicinity of the suction inlet for oxygen-carrying air and for rejecting combustion products into the ambient air. Such a system for exhausting the combustion products from a condensation boiler into the ambient air serves to reduce the wreath of vapor to a certain extent, but requires a heat exchanger to be disposed in the immediate vicinity of the combustion product outlet, and this is not always convenient nor is it always favorable for optimum heat recovery.

Preferred embodiments of the present invention seek to reduce the risk of a wreath of vapor appearing at the outlet from the exhaust duct for the combustion products from a condensation boiler to as small a value as possible, while reducing unwanted exchanges of heat within the condensation boiler as much as possible.

SUMMARY OF THE INVENTION

The present invention provides a condensation boiler of the type specified above which includes the improvement of a feed duct for fresh oxygen-carrying air taken from the atomosphere and an exhaust duct for exhausting diluted combustion products to the atmosphere downstream from the extractor fan, which ducts are essentially parallel, but not coaxial, and provide a minimum of heat exchange; a first heat exchanger disposed above the heating body for providing heat exchange between the fresh air from the feed duct and the combustion products from the heating body prior to dilution; deflectors for channeling a portion of the air from said first heat exchanger and for sweeping the free space situated between the heating body and the airtight enclosure while the remainder of the air from the first heat exchanger is directed towards the burner, and at least one calibrated orifice for injecting the air which has swept over the heating body into the exhaust duct for the combustion products upstream from the extractor fan.

In a first possible embodiment, the first heat exchanger is a counter-flow type heat exchanger with the air flow descending and the combustion product flow rising.

In another embodiment, which is generally preferable, the first heat exchanger is of the parallel flow type, with both the air flow and the combustion product flow descending.

In an embodiment which is particularly applicable for use with a heating body which is not airtight, the boiler includes a second heat exchanger disposed above the heating body for exchanging heat between the air which has swept over the heating body and the combustion products from the heating body before said combustion products enter the first heat exchanger.

In this case, the second heat exchanger is disposed above the first heat exchanger and is isolated from the air circuit of the first heat exchanger.

The second heat exchanger is preferably of the cross-flow type, with the air flow rising slightly at a small angle to the horizontal while the combustion products flow downwardly.

In a particular embodiment, the first heat exchanger comprises two half-exchangers situated on either side of a central vertical duct for exhausting the combustion products which have passed through both half-exchangers.

The first and second heat exchangers may be fin type exchangers, for example.

BRIEF DESCRIPTION OF THE DRAWINGS

Embodiments of the invention are described with reference to the accompanying drawings, in which:

FIG. 1 is a simplified diagram showing the principles of a first embodiment of the invention using a single additional air/flue-gas heat exchanger of the counter-flow type;

FIG. 2 is a diagrammatic section through an example of a condensation boiler in accordance with the invention and implementing the principles shown in FIG. 1;

FIGS. 2A and 2B are sections on planes IIA—IIA, and IIB—IIB of FIG. 2;

FIG. 7 is a diagrammatic view of a condensation boiler in accordance with a second embodiment of the invention and using two additional air/flue-gas heat exchangers;

FIG. 8 is a section view similar to FIG. 4, but corresponding to the FIG. 7 embodiment;

FIGS. 9 and 10 are section views on planes IX—IX and X—X of FIG. 8; and

FIG. 11 is a perspective view of the second heat exchanger as shown in FIGS. 7, 8, and 10.

MORE DETAILED DESCRIPTION

Figure 3:
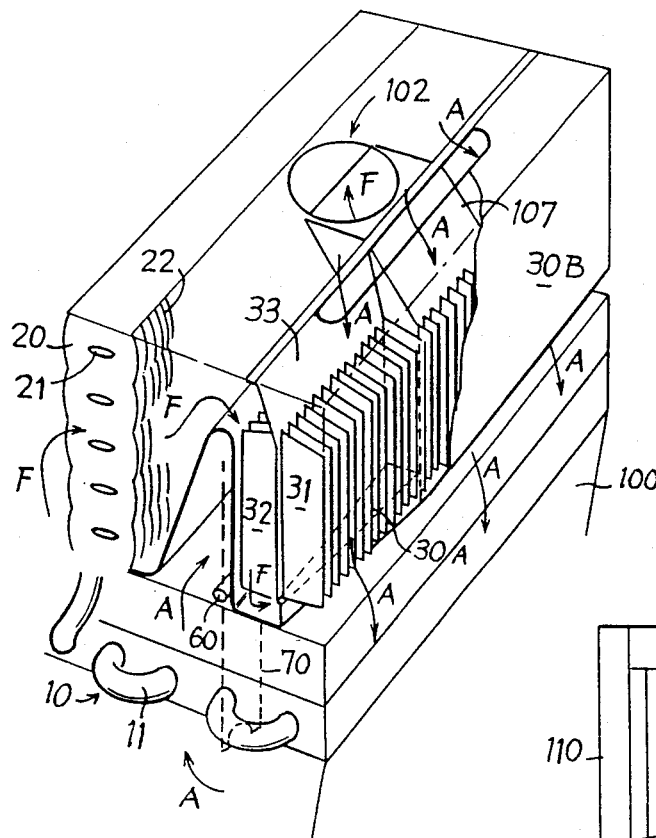
FIG. 3 is a perspective view of a condensation boiler in accordance with the embodiment shown in FIGS. 1 and 2, but having a parallel current air/flue-gas heat exchanger.
Figure 5:
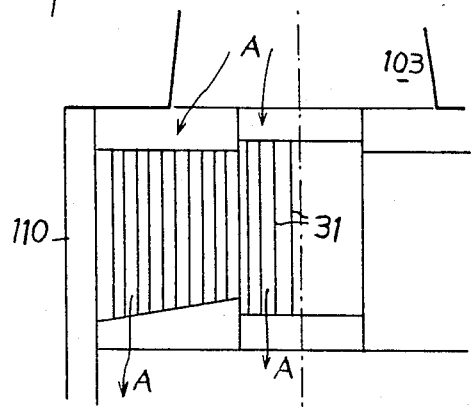
FIGS. 5 and 6 are section views on planes V—V and VI—VI of FIG. 4.
Figure 4:
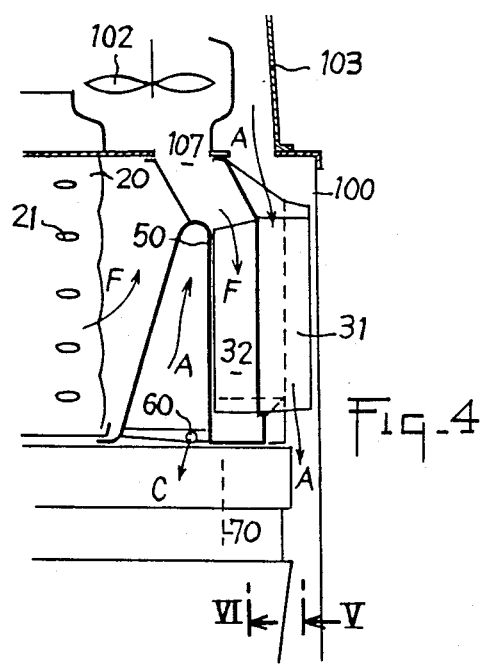
FIG. 4 is a fragmentary section showing the additional air/flue-gas heat exchanger of FIG. 3.
Figure 6:
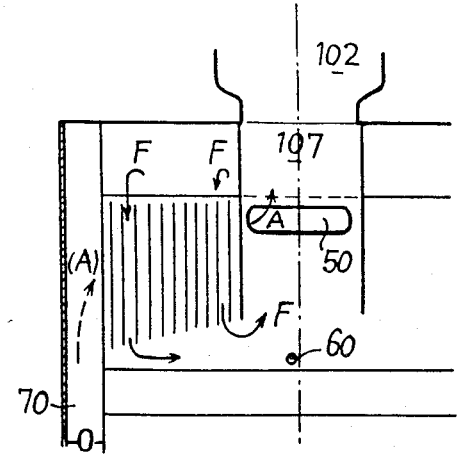

FIG. 2 shows a condensation boiler having an outer airtight enclosure 110 containing a heating body 100 with a burner 101 disposed on the base thereof and fed with gas from a channel 108. The heating body 100 comprises a main heat exchanger 10 constituted by a set of ducts 11 through which there flows a fluid to be heated and which are in contact with the combustion products from the burner 101. A heat exchanger-condenser 20 comprising ducts 21 with fins 22 and with the fluid to be heated flowing along the ducts provides additional heat exchange between the combustion products which have already passed through the main heat exchanger and the fluid flowing along the ducts 21. When heat exchange takes place in the exchanger-condenser 20, the combustion products lose a portion of the water which they contain, said water condensing and being recovered by a collector channel for removing condensed water (not shown in FIG. 2). After passing through the exchanger-condenser 20, the combustion products F are sucked by a fan 102 in a central duct 107 and exhausted to the atmosphere via an exhaust duct 106. The oxygen-carrying air required for feeding to the burner 101 is obtained via a duct 105 adjacent to the ducts 106 for exhausting the combustion products.

In a conventional condensation boiler connected to the outside via a ventilation opening through a wall, the flue gas exhaust duct 106 and the fresh air feed duct are generally coaxial. This gives rise to considerable heat exchange therebetween, and the heat exchange may be increased by installing a proper heat exchanger between the ducts 105 and 106, as described for example, in French patent application No. 8315657.

In contrast, in accordance with the present invention an effort is made to reduce heat exchange as much as possible between the fresh air inlet duct 105 and the combustion product exhaust duct 106. As can be seen in FIG. 2, FIG. 2A, and FIG. 2B, the air inlet duct 105 and the combustion product exhaust duct 106 are disposed parallel to each other without being coaxial and they are of substantially equal diameter. As can be seen in FIG. 2B, the ducts 105 and 106 may be enclosed within a common sheath 104 and they may be disposed tangentially to each other. Heat insulating material 109 is disposed inside the sheath 104 and occupies the space between the ducts 105 and 106. Although the ducts 105 and 106 may have the configuration shown in FIG. 2B over the greater portion of the length of the sheath 104 downstream from the fan 102, in the vicinity of the end of the sheath 104 the flue gas exhaust duct 106 is displaced onto the axis of the sheath 104 while the fresh air inlet tube 105 is extended by a portion which runs into the sheath 104 so as to provide an air suction inlet which is disposed coaxially around the tube 106, as shown in Figure 2A. This makes it possible to provide dynamic equilibrium in the presence of obliquely-directed winds at the end opening out to the atmosphere. The configuration of the ducts 105 and 106 shown in FIG. 2 limits heat exchange between the fresh air in the duct 105 and the combustion products as already diluted with air being exhausted via the duct 106.

The diagram of FIG. 1 shows the path followed by the air A taken from the outside and also the path followed by the flue gases F which leave the heating body 100. The air A taken from the outside at a relatively low temperature, for example around 0° C. is conveyed to the inlets of a first air/flue-gas heat exchanger 30. Because of the low rate of heat exchange along the air inlet duct 105 and inside the cover 103 surrounding the fan 102, the air A as fed to the heat exchanger 30 is still at a relatively low temperature. For example, the air A may be at a temperature of about 15° C. at the inlet to the heat exchanger 30 and it may be at a temperature of about 28° C. at the outlet therefrom. The air A coming from the heat exchanger 30 flows between the heating body 100 and the airtight outer enclosure 110 and is guided by deflectors disposed between the heating body 100 and the airtight enclosure 110 so that a portion of the air A is directed towards the burner 101 to provide oxygen thereto, while another portion of the air A is caused to flow round the heating body 100 in the empty space between the heating body and the airtight enclosure 110, thereby recovering heat losses from the heating body. The oxygen-carrying air may thus arrive at the burner 101 at a temperature of about 90° C., and air heated by heat loses from the heating body may be at a temperature of about 60° C. when it is mixed with the combustion products in the vicinity of the fan 102. The combustion products F from the heating body 100 are inserted into the heat exchanger 30, for example through the bottom thereof, at a temperature which may be about 45° C., and they are mixed with the dilution air at the outlet from the heat exchanger 30.

FIGS. 1 and 2 show a counter-flow heat exchanger 30 in which the air flow is descending while the flue gas flow is rising. In practice, it is nevertheless preferable to use a heat exchanger 30 in which the flows are parallel and in the same direction, as shown in FIGS. 3 to 10. In the heat exchanger 30 it is preferable for the flow of flue gases F in contact with the fins 32 to be a descending flow in order to avoid entraining condensates to the fan 102. In contrast, there is no reason why the fresh air A in contact with the fins 31 of the heat exchanger 30 should not also be descending. The temperature drop of the flue gases F inside the heat exchanger 30 is small, about 5° C., and the temperature of the fins 31 and 32 is fairly uniform given their relatively sort length, e.g. about 12 cm. As can be seen in FIG. 3, the heat exchanger 30 is advantageously constituted by two half-exchangers 30A and 30B which are situated on either side of a rising central duct 107 which opens out into the inlet to the fan 102. The flue gases F flow downwardly through each of the two half-exchangers 30A and 30B and come into contact with the fins 32 disposed on one side of a middle plate 33, while the fresh air A descends in contact with the fins 31 situated on the other side of the middle plate 33. The flue gases from the heat exchanger 30 then rise via the central duct 107 to be mixed with the air A sucked in by the fan 102 so as to produce a flow of diluted flue gases which is exhausted via the duct 106. The air A leaving the heat exchanger 30 is caused to follow a fairly long path over the sides and the bottom of the heating body 100 before being sucked back towards the inlet to the fan 102 by virtue of deflectors 70 disposed in the gap between the heating body and the airtight enclosure 110 (not shown in FIG. 3). The condensates C formed in the heat exchanger 30 are recovered from the bottom thereof and are exhausted via a duct 60 (see FIG. 4).

The air A heated in the gap between the heating body 100 and the boiler's airtight enclosure 110 is taken up via a calibrated opening 50 disposed immediately adjacent to the inlet to the extractor fan 102 for mixing with the flue gases from the heat exchanger 30.

The invention is easily applicable to existing boilers. For boilers having an airtight heating body above the burner, a small cold-air/flue-gas heat exchanger block 30 may be mounted above the heating body and a few simple parts need adding to serve as the deflectors 70 between the heating body 100 and the outer cladding 110 of the boiler. The air inlet duct 105 and the combustion product exhaust duct 106 would also need modifying in the vicinity of the ventilation opening through the wall in contact with the outside atmosphere. Since the resulting increase in head loss is practically negligible, the original fan will not normally need changing. These few modifications provide considerable superheating of the dilution air which flows for several tens of centimeters around the heating plane prior to being sucked together with the cooled flue gases into the fan 102.

Some existing boilers have a heating body 100 which is not airtight. In this case, sweeping the outside of the heating body may cause the products of incomplete combustion to be picked up. As a result the levels of carbon monoxide may be excessive. The dilution air then needs to be rapidly separated from the oxygen-carrying air. In this case, a second heat exchanger 40 is used in addition to the heat exchanger 30. The first heat exchanger 30 may be similar to that described above and constitutes a cold stage which receives all of the air conveyed by the inlet duct 105. The second heat exchanger 40 constitutes a hot stage and receives the raw flue gases F from the heating body and the dilution air from the first heat exchanger 30, which air has flowed between the heating body and the outer enclosure 110. The air from the second heat exchanger 40 is then mixed with the combustion products from the first heat exchanger 30. In addition, the combustion products from the second heat exchanger 40 are inserted into the first heat exchanger 30 (FIG. 7). For example, the temperature of the air at the inlet to the first heat exchanger 30 may be about 10° C. and its temperature at the outlet from the first heat exchanger 30 may be about 30° C., the temperature may then rise to about 40° C. at the outlet from the second heat exchanger 40. The temperature of the combustion products may be about 45° C. at the inlet to the second heat exchanger 40, about 43° C. at the outlet from the second heat exchanger 40, and about 40° C. at the outlet from the first heat exchanger 30.

The diagram of FIG. 7 shows the two heat exchangers 30 and 40 having downwardly-directed flue gas flow paths in order to facilitate separating out the condensates. The air flows downwardly through the first heat exchanger 30 and upwardly through the second heat exchanger 40.

In fact, as shown in FIGS. 8, 10, and 11, the fins 41 of the second heat exchanger 40 which are in contact with the air A for being diluted with the flue gasees F are inclined at a relatively small angle to the horizontal and thus define paths which are only slightly rising. Insofar as the second heat exchanger 40 is disposed above the first heat exchanger 30, the fins 42 for coming into contact with the flue gases are preferably vertical so as to define a descending path which is extended by a descending path defined by the fins 32 of the first heat exchanger 30. The second heat exchanger 40 is also provided with heat insulating elements 43 in order to avoid heat exchange between the second heat exchanger and the air A coming from the duct 105 for making contact with the fins 31 of the first heat exchanger 30.

The present invention is effective at reducing the appearance of a wreath of vapor at the outlet from the flue gas duct 106 firstly because the saturated flue gases at the outlet from the heat exchanger-condenser 20 are cooled by means of a fresh air heat exchanger 30, thereby reducing the water content of the flue gases F, and secondly because the flue gases F are then diluted with a portion of the air A which has passed through the heat exchanger 30 and which has additionally been reheated in contact with the heating body 100. In this way, the gas mixture which is rejected to the atmosphere is a nonsaturated mixture which is therefore much less likely to produce a condensation wreath.

In contrast to existing devices, the present invention applies outside air to the inlet of the heat exchanger 30 at as low a temperature as possible, which heat exchanger is located on the flue gas outlet prior to dilution, thereby reducing heat exchange between the fresh air and the hot diluted flue gases which are flowing in a counter-flow along the tube 106.

The variant embodiment shown in FIGS. 7 to 11 operates on the same principles as the embodiments shown in FIGS. 1 to 6, and it is merely intended for fitting to boilers where the heating body is not airtight above the burner. This variant embodiment thus differs from the previous embodiment solely by the fact that the air leaving the first heat exchanger 30 goes partially to the burner 101 and otherwise directly to a second heat exchanger 40 which is situated further upstream on the flue gas circuit and which is thermally separated from the first heat exchanger 30.

I claim:

1. A reduced-wreath condensation boiler comprising:
   a feed duct for taking fresh oxygen-carrying air from the atmosphere;
   an exhaust duct for exhausting diluted combustion products to the atmosphere;
   a feed channel for fuel gas;
   an extractor fan for extracting the combustion products;
   a heating body fitted with a burner;
   at least one heat exchanger-condenser for exchanging heat between a circuit of water to be heated and the combustion products formed in the heating body;
   a circuit for removing the condensed water which forms on the heat exchanger-condenser; and
   an airtight enclosure enclosing said heating body and leaving free space between said enclosure and said heating body;
   said boiler including the improvements of:
   said feed duct and said exhaust duct downstream from said extractor fan being disposed in an essentially parallel, but not coaxial, configuration, thereby minimizing heat exchange therebetween;

a first heat exchanger disposed above the heating body for providing heat exchange between the fresh air from the feed duct and the combustion products from the heating body prior to dilution;

deflectors for channeling a portion of the air from said first heat exchanger and for sweeping said free space situated between the heating body and the airtight enclosure, while the remainder of the air from the first heat exchanger is directed towards the burner; and at least one calibrated orifice for injecting air which has swept over the heating body into the exhaust duct for the combustion products upstream from the extractor fan.

2. A boiler as claimed in claim 1, wherein the first heat exchanger is a counter-flow type heat exchanger with the air flowing downwards and the combustion products flowing upwards.

3. A boiler as claimed in claim 1, wherein the first heat exchanger is of the parallel flow type, with both the air and the combustion products flowing downwardly.

4. A boiler as claimed in claim 1, wherein the first heat exchanger comprises two half-exchangers situated on either side of a central vertical duct for exhausting the combustion products which have passed through both half-exchangers.

5. A boiler as claimed in claim 1, wherein the first heat exchanger is a fin type heat exchanger.

6. A boiler as claimed in claim 1, further including a second heat exchanger disposed above the heating body for exchanging heat between the air which has swept over the heating body and the combustion products from the heating body before said combustion products enter the first heat exchanger.

7. A boiler as claimed in claim 6, wherein the second heat exchanger is a fin type heat exchanger.

8. A boiler as claimed in claim 6, wherein the second heat exchanger is disposed above the first heat exchanger and is isolated from the air circuit of the first heat exchanger.

9. A boiler as claimed in claim 8, wherein the second heat exchanger is of the cross-flow type, with the air flow rising slightly at a small angle to the horizontal while the combustion products flow downwardly.

* * * * *